United States Patent
Kagan et al.

(10) Patent No.: US 8,375,145 B2
(45) Date of Patent: Feb. 12, 2013

(54) DOORBELL HANDLING WITH PRIORITY PROCESSING FUNCTION

(75) Inventors: Michael Kagan, Zichron Yaakov (IL); Diego Crupnicoff, Haifa (IL); Ophir Turbovich, Haifa (IL); Margarita Shnitman, Netivot (IL); Ariel Shachar, Haifa (IL); Gil Bloch, Kiryat Ata (IL)

(73) Assignee: Mellanox Technologies, Ltd., Yokneam (IL)

( * ) Notice: Subject to any disclaimer, the term of this patent is extended or adjusted under 35 U.S.C. 154(b) by 3774 days.

(21) Appl. No.: 10/052,500

(22) Filed: Jan. 23, 2002

(65) Prior Publication Data

US 2002/0165897 A1 Nov. 7, 2002

Related U.S. Application Data

(60) Provisional application No. 60/283,018, filed on Apr. 11, 2001.

(51) Int. Cl.
*G06F 15/16* (2006.01)
*G06F 12/00* (2006.01)
(52) U.S. Cl. .......................... 709/250; 709/216; 709/220
(58) Field of Classification Search .................. 709/216, 709/239, 220; 370/216–228; 710/30, 33; 711/206, 170
See application file for complete search history.

(56) References Cited

U.S. PATENT DOCUMENTS

| | | | | |
|---|---|---|---|---|
| 5,991,818 A | * | 11/1999 | Williams | 709/250 |
| 6,075,791 A | * | 6/2000 | Chiussi et al. | 370/412 |
| 6,629,166 B1 | * | 9/2003 | Grun | 710/36 |
| 6,678,241 B1 | * | 1/2004 | Gai et al. | 370/216 |
| 6,721,806 B2 | * | 4/2004 | Boyd et al. | 719/312 |
| 6,735,642 B2 | * | 5/2004 | Kagan et al. | 710/24 |
| 6,742,051 B1 | * | 5/2004 | Bakshi et al. | 719/318 |
| 6,799,220 B1 | * | 9/2004 | Merritt et al. | 709/238 |
| 6,888,792 B2 | * | 5/2005 | Gronke | 370/227 |
| 7,103,888 B1 | * | 9/2006 | Cayton et al. | 719/313 |
| 7,281,030 B1 | * | 10/2007 | Davis | 709/212 |
| 7,496,095 B1 | * | 2/2009 | Davis | 370/392 |
| 7,715,428 B2 | * | 5/2010 | Basso et al. | 370/463 |
| 2002/0071386 A1 | * | 6/2002 | Gronke | 370/217 |
| 2005/0198410 A1 | * | 9/2005 | Kagan et al. | 710/22 |

OTHER PUBLICATIONS

The InfiniBand Architecture Specification, Release 1.0, Oct. 2000. (Available at: www.infinibandta.org.) pp. 215-218.
The IBM PCI-X to InifiniBand Host Channel Adapter, Produced by IBM Microelectronics Division, Hopewell Junction, New York, Oct. 2000.

* cited by examiner

*Primary Examiner* — Sargon Nano
(74) *Attorney, Agent, or Firm* — Mark M Friedman

(57) ABSTRACT

A network interface adapter provides a host processor with two complementary modes of submitting descriptors to be executed by the adapter: a normal mode, in which the host writes descriptors to a system memory and rings an assigned doorbell to notify the adapter; and a priority mode, in which the host writes the descriptor itself to a doorbell address of the adapter. In the priority mode, the adapter is relieved of the need to read the descriptor from the memory, and can thus begin execution as soon as it has resources available to do so.

29 Claims, 3 Drawing Sheets

DOORBELL HANDLING WITH PRIORITY PROCESSING FUNCTION

CROSS-REFERENCE TO RELATED APPLICATION

This application claims the benefit of U.S. Provisional Patent Application No. 60/283,018, filed Apr. 11, 2001, which is incorporated herein by reference.

FIELD OF THE INVENTION

The present invention relates generally to computer systems, and specifically to devices and methods for direct memory access (DMA) and communication in such systems.

BACKGROUND OF THE INVENTION

Direct memory access (DMA) is an efficient means for transferring data to and from a memory without direct involvement of a central processing unit (CPU). A DMA engine performs the desired data transfer operations as specified by DMA instructions, known as descriptors. The descriptors typically indicate, for each operation, a source address from which to read the data, and information regarding disposition of the data. The descriptors are commonly organized in memory as a linked list, or chain, in which each descriptor contains a field indicating the address in the memory of the next descriptor to be executed.

In order to initiate a chain of DMA data transfers, an application program running on a CPU prepares the appropriate chain of descriptors in a memory accessible to the DMA engine. The CPU then sends a message to the DMA engine indicating the memory address of the first descriptor in the chain, which is a request to the DMA engine to start execution of the descriptors. The application typically sends the message to the "doorbell" of the DMA engine—a control register with a certain bus address that is specified for this purpose. Sending such a message to initiate DMA execution is known as "ringing the doorbell" of the DMA engine. The DMA engine responds by reading and executing the first descriptor. The engine follows the "next" field through the linked list until execution of the descriptors is completed or terminated for some other reason.

DMA is used in modern network communication adapters to interface between host computer systems and packet networks. In this case, the host prepares descriptors defining messages to be sent over the network and rings a doorbell of the communication adapter to indicate that the descriptors are ready for execution. The descriptors typically identify data in the host system memory that are to be inserted in the packets. During execution of the descriptors, a DMA engine in the adapter reads the identified data from the memory. The adapter then adds appropriate protocol headers and sends packets out over the network corresponding to the messages specified by the descriptors.

Packet network communication adapters are a central element in new high-speed, packetized, serial input/output (I/O) bus architectures that are gaining acceptance in the computer industry. In these systems, computing hosts and peripherals are linked together by a switching network, commonly referred to as a switching fabric, taking the place of parallel buses that are used in legacy systems. A number of architectures of this type have been proposed, culminating in the "InfiniBand™" (IB) architecture, which is described in detail in the *InfiniBand Architecture Specification*, Release 1.0 (October, 2000), which is incorporated herein by reference. This document is available from the InfiniBand Trade Association at www.infinibandta.org.

A host connects to the IB fabric via a network adapter, which is referred to in IB parlance as a host channel adapter (HCA). When an IB "consumer," such as an application process on the host, needs to open communications with some other entity via the IB fabric, it asks the HCA to provide the necessary transport service resources by allocating a transport service instance, or queue pair (QP), for its use. Each QP has a send queue and a receive queue and is configured with a context that includes information such as the destination address (referred to as the local identifier, or LID) for the QP, service type, and negotiated operating limits. Communication over the fabric takes place between a source QP and a destination QP, so that the QP serves as a sort of virtual communication port for the consumer.

To send and receive communications over the IB fabric, the consumer initiates a work request (WR) on a specific QP. There are a number of different WR types, including send/receive and remote DMA (RDMA) read and write operations, used to transmit and receive data to and from other entities over the fabric. WRs of these types typically include a gather list, indicating the locations in system memory from which data are to be read by the HCA for inclusion in the packet, or a scatter list, indicating the locations in the memory to which the data are to be written by the HCA. When the client submits a WR, it causes a work item, called a work queue element (WQE), to be placed in the appropriate queue of the specified QP in the HCA. The HCA then executes the WQE, including carrying out DMA operations specified by the gather or scatter list submitted in the WR. In this way, it generates outgoing packets and processes incoming packets so as to communicate with the corresponding QP of the channel adapter at the other end of the link.

WRs can thus be regarded as descriptors, specifying DMA and other operations to be executed by the HCA. In typical implementations, to initiate a WR, the consumer writes the corresponding descriptor to the system memory of the host and then rings a doorbell on the HCA. A range of addresses in the memory space of the host is assigned to the HCA for use as doorbells by consumers in accessing their allocated QPs. When the consumer writes to its assigned doorbell, it prompts the HCA to read the descriptor from the memory and service the WR.

SUMMARY OF THE INVENTION

It is an object of some aspects of the present invention to provide improved methods and devices for efficient host access to data network communications.

It is a further object of some aspects of the present invention to provide improved methods and circuitry for controlling execution of descriptors by direct memory access (DMA) engines, network adapters and other hardware acceleration devices.

It is yet a further object of some aspects of the present invention to provide an enhanced doorbell mechanism and methods for doorbell handling.

In preferred embodiments of the present invention, a network interface adapter provides a host processor with two complementary modes of submitting descriptors to be executed by the adapter: a normal mode, in which the host writes descriptors to a system memory and rings an assigned doorbell to notify the adapter; and a priority mode, in which the host writes the descriptor itself to a doorbell address of the adapter. In the priority mode, the adapter is relieved of the need to read the descriptor from the memory, and can thus begin execution as soon as it has resources available to do so. Because the adapter typically has limited buffer space available to hold descriptors awaiting processing, the host is preferably programmed to restrict its own use of the priority mode. Most preferably, when the host attempts to write a descriptor to the adapter doorbell in priority mode, it also writes the descriptor to the system memory, so that the adapter can execute the descriptor in the normal mode when it is not able to carry out the requested priority processing.

In some preferred embodiments of the present invention, the network interface adapter comprises a HCA, which connects the host to an IB fabric. Preferably, the HCA has multiple doorbells, for use by different QPs allocated to consumer processes on the host. Most preferably, each consumer process is assigned its own doorbell, in the form of a page in the address space of the HCA, to be used for all QPs allocated to that process. This allocation scheme is described in a U.S. patent application entitled, "Multiple Queue Pair Access with a Single Doorbell," filed Nov. 26, 2001, which is assigned to the assignee of the present patent application, and whose disclosure is incorporated herein by reference. A consumer process rings its doorbell by writing a command to its assigned page, specifying the QP on which it wishes to submit the current descriptor that it has prepared. Each page includes a dedicated priority area, to which the consumer process writes the descriptor when it wishes to invoke priority mode execution by the HCA.

Although preferred embodiments are described herein with reference to interaction between a host and a network adapter, the principles of the present invention are similarly applicable in other situations, such as storage applications, in which a host submits descriptors to a DMA engine or other hardware device, and then rings a doorbell to alert the device. The priority doorbell mechanism enables the hardware device to achieve enhanced processing speed (particularly when pressure on resources of the device is light) by reducing the number of system memory reads it must carry out. At the same time, the host can take advantage of the priority doorbell mechanism to prioritize its use of the hardware device resources.

There is therefore provided, in accordance with a preferred embodiment of the present invention, a method for communication over a network, including:

assigning one or more doorbell addresses on a network interface adapter for use by a host processor;

writing a first descriptor to a system memory associated with the host processor, the first descriptor defining a first message to be sent over the network;

writing a command to a first one of the doorbell addresses instructing the adapter to read and execute the first descriptor;

writing a second descriptor to a second one of the doorbell addresses, the second descriptor defining a second message to be sent over the network;

responsive to the command having been written to the first one of the doorbell addresses, reading the first descriptor from the system memory using the network interface adapter, and sending the first message from the network interface adapter over the network responsive to the first descriptor; and responsive to the second, descriptor having been written to the second one of the doorbell addresses, sending the second message from the network interface adapter over the network.

Preferably, assigning the one or more doorbell addresses includes allocating a priority area for writing the descriptors within an address range defined by the one or more doorbell addresses, and writing the second descriptor includes writing the second descriptor to the priority area. Typically, writing the second descriptor to the priority area includes writing the second descriptor after writing the command to the first one of the doorbell addresses, and sending the second message includes, responsive to writing the second descriptor to the priority area, sending the second message before sending the first message. Preferably, writing the second descriptor includes writing the second descriptor to the system memory, as well as to the priority area, and sending the second message includes, when the second descriptor is successfully written in its entirety to the priority area, executing the second descriptor written to the priority area without reading the second descriptor from the system memory.

Typically, writing the first and second descriptors includes indicating first and second ranges of data to be read from the system memory for inclusion in the first and second messages, respectively, and sending the first and second messages includes reading the data from the first and second ranges responsive to the first and second descriptors. Preferably, reading the data includes reading the data using direct memory access (DMA) by the network interface adapter to the system memory.

Preferably, assigning the one or more doorbell addresses includes assigning first and second doorbell addresses respectively to first and second processes running on the host processor, and writing the command includes writing the command to the first doorbell address using the first process, and writing the second descriptor includes writing the second descriptor to the second doorbell address using the second process.

Further preferably, sending the first and second messages includes sending one or more data packets over the network for each of the messages. In a preferred embodiment, the network includes a switch fabric, and wherein the network interface adapter includes a host channel adapter (HCA), and writing the first and second descriptors includes submitting work requests (WRs) for execution by the HCA.

There is also provided, in accordance with a preferred embodiment of the present invention, a method for direct memory access (DMA), including:

writing a first descriptor to a system memory associated with a host processor, the first descriptor defining a first operation for execution by a DMA engine;

writing a command to a first doorbell address of the DMA engine, instructing the engine to read and execute the first descriptor;

writing a second descriptor to a second doorbell address of the DMA engine, the second descriptor defining a second operation for execution by the DMA engine;

responsive to the command written to the first doorbell address, reading the first descriptor from the system memory and executing the first descriptor using the DMA engine; and responsive to the second descriptor having been written to the second doorbell address, executing the second descriptor using the DMA engine.

Preferably, writing the first and second descriptors includes indicating first and second address ranges, respectively, in the system memory, and executing the first and second descriptors includes at least one of a scatter step, including conveying data from a data source to at least one of the first and second address ranges, and a gather step, including conveying data from at least one of the first and second address ranges to a data target.

There is additionally provided, in accordance with a preferred embodiment of the present invention, a network interface adapter, for coupling a host processor to a communication network, the adapter including:

a range of doorbell addresses in an address space of the host processor, the range including first and second doorbell addresses;

execution circuitry, adapted to send messages over the network responsive to descriptors prepared by the host processor, the descriptors including first and second descriptors; and a doorbell handler, which is coupled to the range of doorbell addresses so as to receive a command written by the host processor to the first doorbell address, indicating that the first descriptor has been written to a system memory associated with the host processor, the first descriptor defining a first one of the messages, and so as to receive the second descriptor written by the host processor to the second doorbell address, the second descriptor defining a second one of the messages, the doorbell handler being further coupled, responsive to the command having been written to the first doorbell address, to instruct the execution circuitry to read the first descriptor from the system memory and to execute the first descriptor so as to send the first one of the messages, and responsive to the second descriptor having been written to the second doorbell address, to pass the second descriptor to the execution circuitry and to instruct the execution circuitry to execute the second descriptor so as to send the second one of the messages.

Preferably, the second doorbell address is in a priority area within the address range, allocated for writing the descriptors thereto by the host processor, and the execution circuitry includes a scheduler, which is adapted to determine an order of execution of the descriptors by the execution circuitry, and responsive to the second descriptor having been written to the priority area, the doorbell handler is adapted to place the second descriptor in the order for execution ahead of the first descriptor.

Typically, the first and second descriptors indicate first and second ranges of data to be read from the system memory for inclusion in the first and second messages, respectively, and the execution circuitry is adapted to read the data from the first and second ranges responsive to the first and second descriptors. Preferably, the execution circuitry includes a gather engine, which is coupled to read the data by direct memory access (DMA) to the system memory.

There is further provided, in accordance with a preferred embodiment of the present invention, a host channel adapter, for coupling a host processor to a switch fabric, the adapter including:

a range of doorbell addresses in an address space of the host processor, the range including first and second doorbell addresses;

execution circuitry, adapted to generate data packets for transmission over the network responsive to work requests prepared by the host processor, the work requests including first and second work requests; and a doorbell handler, which is coupled to the range of doorbell addresses so as to receive a command written by the host processor to the first doorbell address, indicating that the first work request has been written to a system memory associated with the host processor, and so as to receive the second work request written by the host processor to the second doorbell address, the doorbell handler being further coupled, responsive to the command having been written to the first doorbell address, to pass instructions to the execution circuitry to read the first work request from the system memory and to execute a first work queue element corresponding to the first work request so as to generate the data packets called for by the first work request, and responsive to the second work request having been written to the second doorbell address, to pass a work queue element corresponding to the second work request to the execution circuitry and to instruct the execution circuitry to execute the second work queue element so as to generate the data packets called for by the second work request.

There is moreover provided, in accordance with a preferred embodiment of the present invention, a direct memory access (DMA) device, including:

a range of doorbell addresses in an address space of a host processor, the range including first and second doorbell addresses;

a DMA engine, adapted to access a system memory associated with the host processor, responsive to descriptors prepared by the host processor, the descriptors including first and second descriptors defining respective first and second operations for execution by the DMA engine; and a doorbell handler, which is coupled to the range of doorbell addresses so as to receive a command written by the host processor to the first doorbell address, indicating that the first descriptor has been written to the system memory, and so as to receive the second descriptor written by the host processor to the second doorbell address, the doorbell handler being further coupled, responsive to the command having been written to the first doorbell address, to instruct the DMA engine to execute the first operation responsive to the first descriptor in the system memory, and responsive to the second descriptor having been written to the second doorbell address, to instruct the DMA engine to execute the second operation.

The present invention will be more fully understood from the following detailed description of the preferred embodiments thereof, taken together with the drawings in which:

DETAILED DESCRIPTION OF PREFERRED EMBODIMENTS

Figure 1:
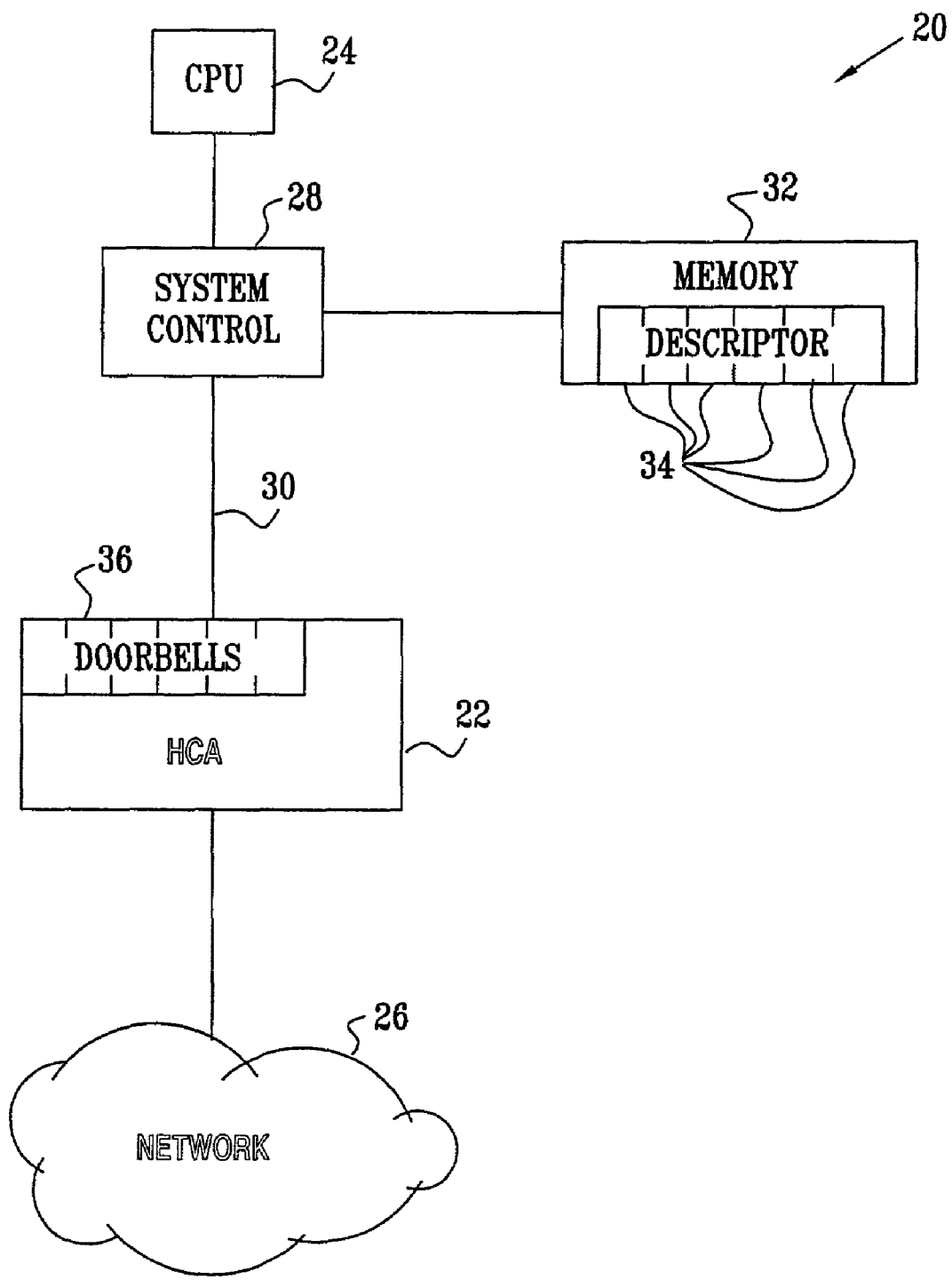
FIG. 1 is a block diagram that schematically illustrates a computer network communication system, in accordance with a preferred embodiment of the present invention.

FIG. 1 is a block diagram that schematically illustrates an InfiniBand (IB) network communication system 20, in accordance with a preferred embodiment of the present invention. In system 20, a host channel adapter (HCA) 22 couples a host processor 24 to an IB network (or fabric) 26. Preferably, HCA 22 comprises a single-chip device, including one or more embedded microprocessors and memory on-board. Alternatively, multi-chip implementations may be used. Typically, host 24 comprises an Intel Pentium™ processor or other general-purpose computing device with suitable software. Host 24 interacts with HCA 22 by opening and manipulating queue pairs (QPs), as provided by the above-mentioned IB specification. HCA 22 typically communicates via network 26 with other HCAs, as well as with target channel adapters (TCAs) connected to peripheral devices (not shown in the figures).

Host 24 and HCA 22 are connected by a suitable system controller 28 to a system memory 32 via a bus 30, such as a Peripheral Component Interface (PCI) bus, as is known in the art. The HCA and memory typically occupy certain ranges of physical addresses in a defined address space on the bus. In order to send and receive packets over fabric 26, consumer processes on host 24 write descriptors 34 to memory 32. Descriptors 34 are preferably prepared and executed in the form of a linked list, as described in U.S. Pat. No. 6,735,642, issued May 11, 2004, which is assigned to the assignee of the present patent application, and whose disclosure is incorporated herein by reference. A separate linked list of descriptors is preferably maintained for each QP in use by host 24.

After preparing a list of one or more descriptors 34, host 24 rings a doorbell 36 to notify HCA 22 that the descriptors are ready for execution. HCA 22 preferably has multiple doorbells 36, for use by different QPs allocated to consumer processes on the host. Most preferably, each consumer process is assigned its own doorbell, in the form of a page in the address space of the HCA, to be used for all QPs allocated to that process, as described in the above-mentioned patent application entitled, "Multiple Queue Pair Access with a Single Doorbell." A consumer process rings its doorbell by writing a command to its assigned page, specifying the QP on which it wishes to submit the current descriptor that it has prepared, an opcode indicating the operation to be carried out by the HCA, and the address and length of the descriptor. In response to the doorbell, the HCA retrieves context information regarding the QP, and then reads and executes the descriptors.

Figure 2:
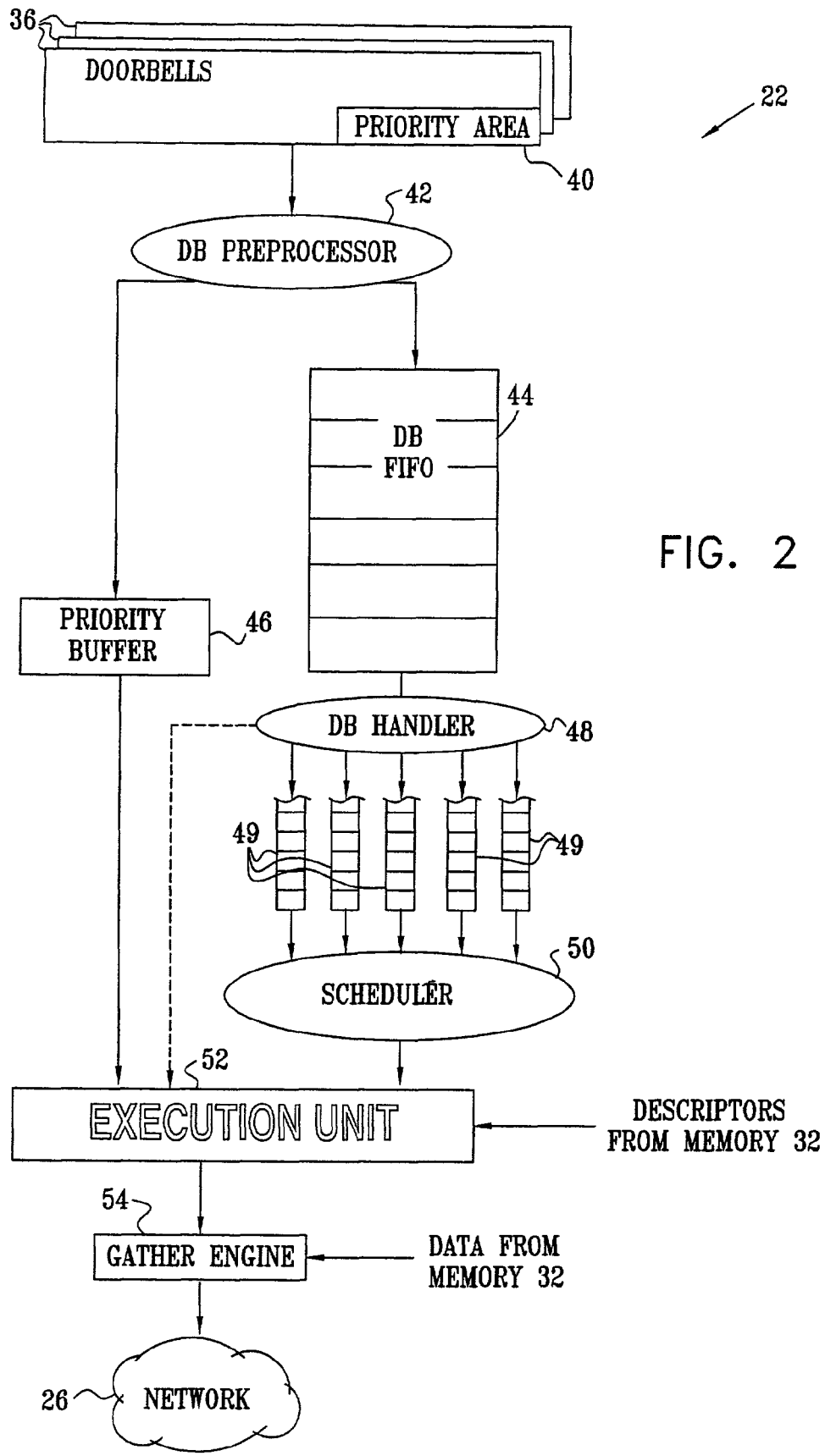
FIG. 2 is a block diagram that schematically shows details of a network interface adapter, in accordance with a preferred embodiment of the present invention.

FIG. 2 is a block diagram that schematically shows functional elements of HCA 22 that are involved in handling doorbells 36 and processing descriptors 34, in accordance with a preferred embodiment of the present invention. Other aspects of HCA 22 are described in the above-mentioned U.S. patent applications, as well as in another U.S. patent application entitled, "Network Interface Adapter with Shared Data Send Resources," filed Dec. 4, 2001, which is assigned to the assignee of the present patent application, and whose disclosure is incorporated herein by reference. Each doorbell 36 preferably comprises a page (typically 4 KB) in the address space on bus 30. A segment of each doorbell page is set aside as a priority area 40. Processes (consumers) on host 24 can write their descriptors to this area for priority handling by HCA 22. Preferably, when a descriptor is written to priority area 40, it is written to memory 32, as well.

A doorbell preprocessor 42 accumulates data written to doorbell 36, preferably for as long as the data are written to sequential addresses within a single doorbell page. Preprocessor 42 is preferably implemented in hardware logic in HCA 22, although the preprocessor may alternatively be implemented in software on an embedded microprocessor or as a combination of hardware and software elements. When a non-sequential write is received, preprocessor 42 writes the data it has received so far to a doorbell first-in-first-out (FIFO) buffer 44. The preprocessor also writes a command, preceding the data in FIFO 44, indicating the type of operation requested by the host process and the length of the doorbell data to follow the command, as well as the QP number and the address of doorbell 36 written to by the consumer process.

When preprocessor 42 detects that the host process has made sequential, non-interrupted writes of descriptor data to priority area 40 of its doorbell 36, it passes the data to a priority buffer 46. If another process begins to write to the priority area of its own doorbell before the previous process has finished writing a complete descriptor, priority buffer 46 is preferably taken over by the new process, and the old buffer contents are discarded. Therefore, host 24 preferably writes the descriptor data to memory 32, as well, so that the descriptor will still be executed even if the priority buffer is preempted in this manner. Once an entire descriptor has been written and passed to the priority buffer without interruption, preprocessor 42 places a corresponding command in doorbell FIFO 44, indicating that the descriptor for this command can be found in priority buffer 46. Preferably, the command also contains a field giving the length of the descriptor that has been entered in the priority buffer, which is useful in ensuring that when the command is subsequently carried out, the descriptor read from the buffer is the correct one.

A doorbell handler 48 pops doorbell commands and data from doorbell FIFO 44 and places the corresponding QPs in scheduling queues 49. The doorbell handler is preferably implemented in software on an embedded microprocessor, although hardware and mixed hardware/software implementations are also possible. Preferably, the QPs are assigned to scheduling queues based on their respective levels of service, as described in a U.S. patent application entitled, "Handling Multiple Network Transport Service Levels with Hardware and Software Arbitration," filed on even date, which is assigned to the assignee of the present patent application, and whose disclosure is incorporated herein by reference. Before placing a given QP in its scheduling queue, however, doorbell handler 48 checks the QP context to make sure that the doorbell page on which it has received the data is the correct one for this QP. If not, it means that the host process that rang the doorbell is not authorized to access this QP, and the doorbell handler consequently drops the data.

A scheduler 50 selects the QPs in scheduling queues 49 for service and passes them to an execution unit 52. Preferably, the scheduler is implemented as a software process, most preferably on the same embedded microprocessor as doorbell handler 48. The scheduler preferably determines the order in which the QPs are to be serviced based on their service levels, most preferably as described in the above-mentioned U.S. patent application entitled "Handling Multiple Network Transport Service Levels with Hardware and Software Arbitration."

To service a given QP, execution unit 52 reads and executes the descriptors in the linked list prepared for the QP by the host process. Typically, the execution unit reads descriptors 34 from memory 32. When the command prepared by preprocessor 42 indicates that the descriptor has been entered in priority buffer 46, however, execution unit 52 reads the descriptor from the buffer. Based on the descriptor, the execution unit prepares a packet header and gather entries as required, indicating addresses and lengths of data to be read from memory 32. A gather engine 54 reads the appropriate data from memory 32 in a DMA operation and assembles the header and data into a packet for transmission over network 26.

The description above relates to operation of HCA 22 in preparing outgoing request packets, in response to work requests submitted by host 24. Preferably, execution unit 52 and gather engine 54 also prepare outgoing response packets, in response to incoming request packets received by HCA 22 from other entities on network 26. This response process is described in detail in the above-mentioned patent application entitled, "Network Interface Adapter with Shared Data Send Resources." When an incoming read request, for example, is received on a certain QP, a request data engine in the HCA (not shown here in the figures) prepares a descriptor indicating the data to be read from memory 32 in response to the request, and pushes an entry into an internal doorbell FIFO. Typically the descriptor is written to off-chip memory, in order to conserve memory resources in the HCA chip. Preferably, the descriptor may also be written to a priority descriptor FIFO on the HCA chip, in order to avoid having to read the descriptor from the off-chip memory. In order to generate the outgoing response packets, doorbell handler 48 and execution unit 52 process the entries in this internal doorbell FIFO and priority descriptor FIFO in a manner similar to that described above with respect to external (host) doorbell FIFO 44 and priority buffer 46.

Figure 3:
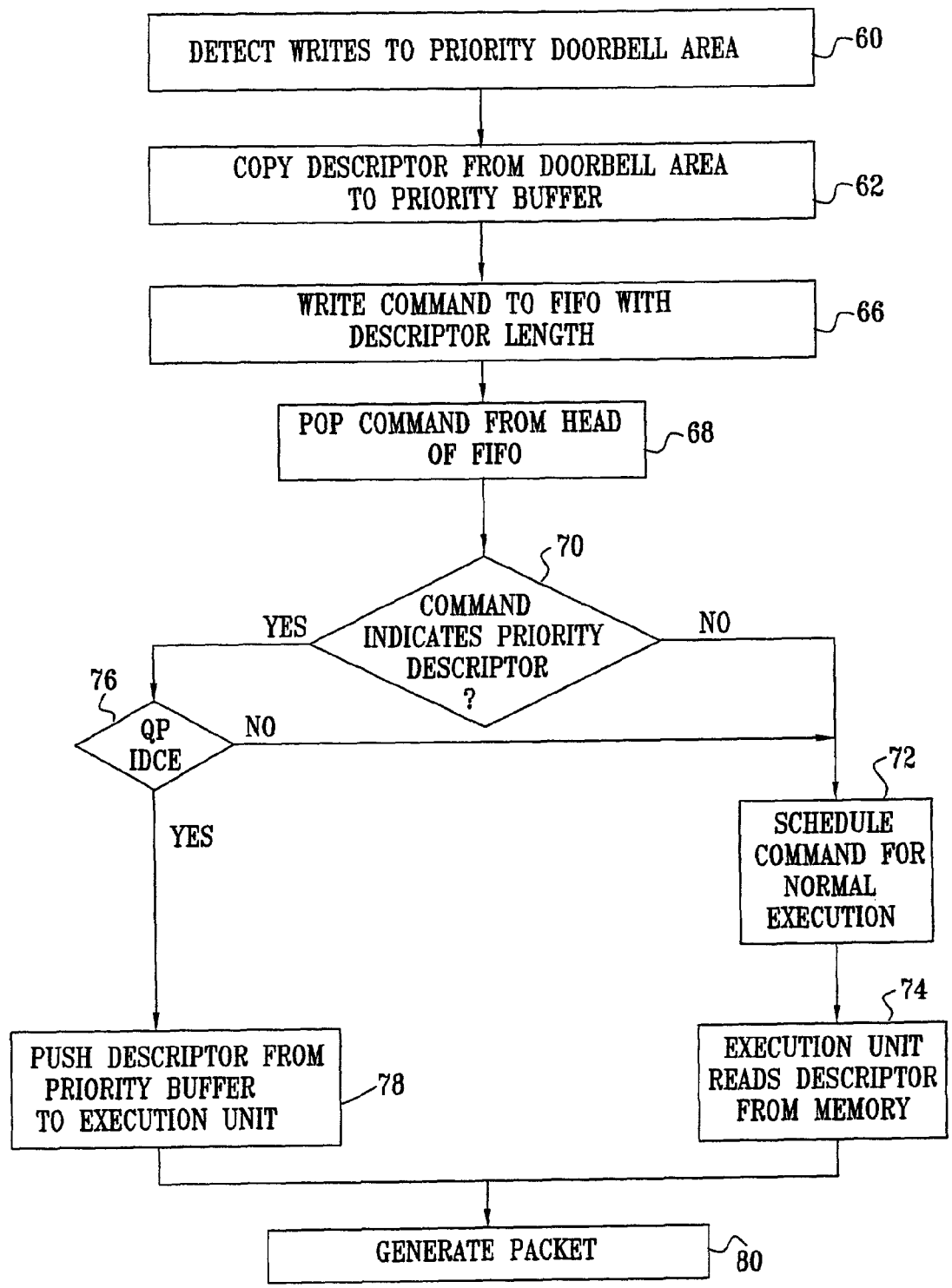
FIG. 3 is a flow chart that schematically illustrates a method for processing descriptors submitted by a host processor to a network interface adapter, in accordance with a preferred embodiment of the present invention.

FIG. 3 is a flow chart that schematically illustrates a method for doorbell handling and descriptor processing using priority area 40, in accordance with a preferred embodiment of the present invention. The method is triggered when doorbell preprocessor 42 detects that a host process has written to priority area 40, at a priority detection step 60. The preprocessor copies the data written to priority area 40 into priority buffer 46, at a copying step 62. This step continues as long as the preprocessor continues to detect sequential, uninterrupted writes to area 40, until a complete descriptor has been written. As noted above, if another host process writes to the beginning of its own priority area 40 before the current descriptor in buffer 46 is complete, the buffer is overwritten, and the copying sequence of step 62 begins again for the new host process. When a complete descriptor has been copied to buffer 46, preprocessor 42 places a command in doorbell FIFO 44, at a command writing step 66. The command indicates the length of the descriptor in buffer 46, along with other parameters.

When the command reaches the head of FIFO 44, doorbell handler 48 pops the command from the FIFO, at a command reading step 68. The doorbell handler reads the command to determine whether it refers to a priority descriptor in buffer 46, at a priority determination step 70. If there is no priority descriptor, the command is scheduled for normal execution, at a normal scheduling step 72. This means that if the QP to which the descriptor belongs is currently idle, the doorbell handler places an entry in one of scheduling queues 49 to which the QP is assigned. When the entry reaches the head of the queue, scheduler 50 passes it to execution unit 52. The execution unit then reads and executes the appropriate descriptor 34 from memory 32, at a descriptor reading step 74. On the other hand, if the QP is already scheduled (i.e., there is already a pending entry in schedule queue 49), or is in execution by the execution unit, there is no reason to add another entry in the schedule queue. Rather, the execution unit reads the descriptor from memory 32 and executes it in its turn, using the fact that each descriptor is linked to the previous descriptor for this QP by the host process that posts it.

Returning now to step 70, if doorbell handler 48 determines at this step that there is a priority descriptor in priority buffer 46 for the current command, it checks to determine the status of the QP to which the command belongs to determine how to handle the descriptor, at a status checking step 76. If the QP is already scheduled or in execution, the doorbell handler ignores the priority descriptor in buffer 46, and applies normal scheduling and execution procedures, at step 72. A later command on a given QP cannot be processed ahead of earlier commands on the same QP, since this may cause HCA 22 to generate packets out of order.

Therefore, priority handling is preferably applied only when doorbell handler 48 determines at step 76 that the QP to which the command belongs is currently idle. If so, the doorbell handler pushes the descriptor from the priority buffer directly to execution unit 52, bypassing schedule queues 49, at a descriptor pushing step 78. The descriptor in buffer 46 is then processed as soon as resources of execution unit 52 become available. The reason for giving priority to descriptors in priority buffer 46 is that, presumably, the host process wrote these descriptors to priority area 40 in order to expedite their processing by HCA 22. Processing these descriptors immediately also helps to avoid blocking of the priority buffer. Even so, doorbell handler 48 may be programmed to admit only certain QPs to the priority processing path, subject to considerations such as the service levels of the QPs or the current occupancy of the schedule queues.

Whether the execution unit reads the required descriptor from memory 32 or from priority buffer 46, it then parses the descriptor and prepares the appropriate gather entries to pass to gather engine 54. Based on the gather entries, the gather engine reads any indicated data from memory 32 and generates one or more packets for transmission over network 26, at a packet generation step 80.

Although preferred embodiments are described herein using terminology specific to IB fabrics and channel adapters, the principles of the present invention are similarly applicable to communication networks and network adapters of other types. These principles may likewise be applied, mutatis mutandis, in other interactions between a host processor and hardware devices, such as DMA engines. It will thus be appreciated that the preferred embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for communication over a network, comprising:
    assigning one or more doorbell addresses on a network interface adapter for use by a host processor;
    writing a first descriptor to a system memory associated with the host processor, the first descriptor defining a first message to be sent over the network;
    writing a command to a first one of the doorbell addresses instructing the adapter to read and execute the first descriptor;
    writing a second descriptor to a second one of the doorbell addresses, the second descriptor defining a second message to be sent over the network;
    responsive to the command having been written to the first one of the doorbell addresses, reading the first descriptor from the system memory using the network interface adapter, and sending the first message from the network interface adapter over the network responsive to the first descriptor; and
    responsive to the second descriptor having been written to the second one of the doorbell addresses, sending the second message from the network interface adapter over the network.

2. A method according to claim 1, wherein assigning the one or more doorbell addresses comprises allocating a priority area for writing the descriptors within an address range defined by the one or more doorbell addresses, and wherein writing the second descriptor comprises writing the second descriptor to the priority area.

3. A method according to claim 2, wherein writing the second descriptor to the priority area comprises writing the second descriptor after writing the command to the first one of the doorbell addresses, and wherein sending the second message comprises, responsive to writing the second descriptor to the priority area, sending the second message before sending the first message.

4. A method according to claim 2, wherein writing the second descriptor comprises writing the second descriptor to the system memory, as well as to the priority area, and wherein sending the second message comprises, when the second descriptor is successfully written in its entirety to the priority area, executing the second descriptor written to the priority area without reading the second descriptor from the system memory.

5. A method according to claim 1, wherein writing the first and second descriptors comprises indicating first and second ranges of data to be read from the system memory for inclusion in the first and second messages, respectively, and wherein sending the first and second messages comprises reading the data from the first and second ranges responsive to the first and second descriptors.

6. A method according to claim 5, wherein reading the data comprises reading the data using direct memory access (DMA) by the network interface adapter to the system memory.

7. A method according to claim 1, wherein assigning the one or more doorbell addresses comprises assigning first and second doorbell addresses respectively to first and second processes running on the host processor, and wherein writing the command comprises writing the command to the first doorbell address using the first process, and writing the second descriptor comprises writing the second descriptor to the second doorbell address using the second process.

8. A method according to claim 1, wherein sending the first and second messages comprises sending one or more data packets over the network for each of the messages.

9. A method according to claim 8, wherein the network comprises a switch fabric, and wherein the network interface adapter comprises a host channel adapter (HCA), and wherein writing the first and second descriptors comprises submitting work requests (WRs) for execution by the HCA.

10. A method for direct memory access (DMA), comprising:
    writing a first descriptor to a system memory associated with a host processor, the first descriptor defining a first operation for execution by a DMA engine;
    writing a command to a first doorbell address of the DMA engine, instructing the engine to read and execute the first descriptor;
    writing a second descriptor to a second doorbell address of the DMA engine, the second descriptor defining a second operation for execution by the DMA engine;
    responsive to the command written to the first doorbell address, reading the first descriptor from the system memory and executing the first descriptor using the DMA engine; and
    responsive to the second descriptor having been written to the second doorbell address, executing the second descriptor using the DMA engine.

11. A method according to claim 10, wherein writing the second descriptor comprises writing the second descriptor to a priority area allocated for writing the descriptors within an address range of the doorbell addresses.

12. A method according to claim 11, wherein writing the second descriptor to the priority area comprises writing the second descriptor after writing the command to the first doorbell address, and wherein executing the second descriptor comprises, responsive to writing the second descriptor to the priority area, executing the second descriptor before executing the first descriptor.

13. A method according to claim 11, wherein writing the second descriptor comprises writing the second descriptor to the system memory, as well as to the priority area, and wherein executing the second descriptor comprises, when the second descriptor is successfully written in its entirety to the priority area, reading and executing the second descriptor written to the priority area using the DMA engine, without reading the second descriptor from the system memory.

14. A method according to claim 10, wherein writing the first and second descriptors comprises indicating first and second address ranges, respectively, in the system memory, and wherein executing the first and second descriptors comprises at least one of a scatter step, comprising conveying data from a data source to at least one of the first and second address ranges, and a gather step, comprising conveying data from at least one of the first and second address ranges to a data target.

15. A network interface adapter, for coupling a host processor to a communication network, the adapter comprising:
    a range of doorbell addresses in an address space of the host processor, the range including first and second doorbell addresses;
    execution circuitry, adapted to send messages over the network responsive to descriptors prepared by the host processor, the descriptors including first and second descriptors; and
    a doorbell handler, which is coupled to the range of doorbell addresses so as to receive a command written by the host processor to the first doorbell address, indicating that the first descriptor has been written to a system memory associated with the host processor, the first descriptor defining a first one of the messages, and so as to receive the second descriptor written by the host processor to the second doorbell address, the second descriptor defining a second one of the messages, the doorbell handler being further coupled, responsive to the command having been written to the first doorbell address, to instruct the execution circuitry to read the first descriptor from the system memory and to execute the first descriptor so as to send the first one of the messages, and responsive to the second descriptor having been written to the second doorbell address, to pass the second descriptor to the execution circuitry and to instruct the execution circuitry to execute the second descriptor so as to send the second one of the messages.

16. An adapter according to claim 15, wherein the second doorbell address is in a priority area within the address range, allocated for writing the descriptors thereto by the host processor.

17. An adapter according to claim 16, wherein the execution circuitry comprises a scheduler, which is adapted to determine an order of execution of the descriptors by the execution circuitry, and wherein responsive to the second descriptor having been written to the priority area, the doorbell handler is adapted to place the second descriptor in the order for execution ahead of the first descriptor.

18. An adapter according to claim 16, wherein the second descriptor is written by the host processor to the system memory, as well as to the priority area, and wherein the doorbell handler is adapted, when the second descriptor is successfully written in its entirety to the priority area, to pass the second descriptor to the execution circuitry without instructing the execution circuitry to read the second descriptor from the system memory.

19. An adapter according to claim 15, wherein the first and second descriptors indicate first and second ranges of data to be read from the system memory for inclusion in the first and second messages, respectively, and wherein the execution circuitry is adapted to read the data from the first and second ranges responsive to the first and second descriptors.

20. An adapter according to claim 19, wherein the execution circuitry comprises a gather engine, which is coupled to read the data by direct memory access (DMA) to the system memory.

21. An adapter according to claim 15, wherein the first and second doorbell addresses are assigned respectively to first and second processes running on the host processor, and wherein the command is written to the first doorbell address using the first process, and the second descriptor is written to the second doorbell address using the second process.

22. An adapter according to claim 15, wherein the execution circuitry is adapted to send the first and second messages by generating data packets to send over the network for each of the messages.

23. An adapter according to claim 22, wherein the network comprises a switch fabric, and wherein the network interface adapter comprises a host channel adapter (HCA), and wherein the first and second descriptors comprise work requests (WRs) submitted by the host processor for execution by the HCA.

24. A host channel adapter, for coupling a host processor to a switch fabric, the adapter comprising:
- a range of doorbell addresses in an address space of the host processor, the range including first and second doorbell addresses;
- execution circuitry, adapted to generate data packets for transmission over the network responsive to work requests prepared by the host processor, the work requests including first and second work requests; and
- a doorbell handler, which is coupled to the range of doorbell addresses so as to receive a command written by the host processor to the first doorbell address, indicating that the first work request has been written to a system memory associated with the host processor, and so as to receive the second work request written by the host processor to the second doorbell address, the doorbell handler being further coupled, responsive to the command having been written to the first doorbell address, to pass instructions to the execution circuitry to read the first work request from the system memory and to execute a first work queue element corresponding to the first work request so as to generate the data packets called for by the first work request, and responsive to the second work request having been written to the second doorbell address, to pass a work queue element corresponding to the second work request to the execution circuitry and to instruct the execution circuitry to execute the second work queue element so as to generate the data packets called for by the second work request.

25. A direct memory access (DMA) device, comprising:
- a range of doorbell addresses in an address space of a host processor, the range including first and second doorbell addresses;
- a DMA engine, adapted to access a system memory associated with the host processor, responsive to descriptors prepared by the host processor, the descriptors including first and second descriptors defining respective first and second operations for execution by the DMA engine; and
- a doorbell handler, which is coupled to the range of doorbell addresses so as to receive a command written by the host processor to the first doorbell address, indicating that the first descriptor has been written to the system memory, and so as to receive the second descriptor written by the host processor to the second doorbell address, the doorbell handler being further coupled, responsive to the command having been written to the first doorbell address, to instruct the DMA engine to execute the first operation responsive to the first descriptor in the system memory, and responsive to the second descriptor having been written to the second doorbell address, to instruct the DMA engine to execute the second operation.

26. A device according to claim 25, wherein the second doorbell address is in a priority area within the address range, allocated for writing the descriptors thereto by the host processor.

27. A device according to claim 26, and comprising a scheduler, which is adapted to determine an order of execution of the operations by the DMA engine, and wherein responsive to the second descriptor having been written to the priority area, the doorbell handler is adapted to place the second operation in the order for execution ahead of the first operation.

28. A device according to claim 26, wherein the second descriptor is written by the host processor to the system memory, as well as to the priority area, and wherein the doorbell handler is adapted, when the second descriptor is successfully written in its entirety to the priority area, to pass the second descriptor to the DMA engine for execution without reading the second descriptor from the system memory.

29. A device according to claim 25, wherein the first and second descriptors indicate first and second address ranges, respectively, in the system memory, and wherein the first and second operations executed by the DMA engine comprise at least one of a scatter operation, comprising conveying data from a data source to at least one of the first and second address ranges, and a gather operation, comprising conveying data from at least one of the first and second address ranges to a data target.

* * * * *